(12) United States Patent
Lei et al.

(10) Patent No.: US 6,401,127 B1
(45) Date of Patent: Jun. 4, 2002

(54) ADAPTIVE TIMER FOR LLC TYPE 2 RELIABLE TRANSPORT IN A COMPUTER NETWORK

(75) Inventors: Alan Lei, Fremont; Nitin Karkhanis, San Francisco; Richard Livingston, Hollister; Uwe Sellentin, San Jose', all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/304,395

(22) Filed: May 4, 1999

(51) Int. Cl.$^7$ .............................................. G06F 13/00
(52) U.S. Cl. ...................... 709/235; 709/232
(58) Field of Search ................. 709/200–253

(56) References Cited

U.S. PATENT DOCUMENTS

| | | | |
|---|---|---|---|
| 5,331,637 A | 7/1994 | Francis et al. ................ | 370/54 |
| 5,353,283 A | 10/1994 | Tsuchiya ..................... | 370/60 |
| 5,442,633 A | 8/1995 | Perkins et al. ............. | 370/94.1 |
| 5,583,996 A | 12/1996 | Tsuchiya ............... | 395/200.15 |
| 5,600,644 A | 2/1997 | Chang et al. ................ | 370/404 |
| 5,633,866 A | 5/1997 | Callon ......................... | 370/397 |
| 5,818,842 A | 10/1998 | Burwell et al. ............. | 370/397 |
| 5,828,844 A | 10/1998 | Civanlar et al. ......... | 395/200.58 |
| 5,898,686 A | 4/1999 | Virgile ........................ | 370/381 |
| 5,909,441 A | 6/1999 | Alexander, Jr. et al. .... | 370/395 |
| 5,909,550 A | 6/1999 | Shankar et al. ......... | 395/200.57 |
| 6,076,114 A | * 6/2000 | Wesley ....................... | 709/235 |

OTHER PUBLICATIONS

Pearlman, Radia, *Interconnections, Bridges and Routers*, Addison Wesley, 1992, pp. 34–35.

Tanenbaum, Andrew, *Computer Networks, Second Edition*, 1988, PGS. 253–257.

Comer, Douglas, E., *Internetworking With TCP/IP, 3$^{rd}$ Edition, vol. 1*, Prentice Hall, 1995, pp. 208–216.

Tanenbaum, Andrew S., "*Computer Networks, 3$^{rd}$ edition*", Prentice Hall, PTR, 1996, pp. 28–54.

RFC 1795 "IETF", Request For Comments, Informational RFC, RFC 1795, dated Apr., 1995, (www.ietf.org)., Section 2.

(List continued on next page.)

Primary Examiner—David Wiley
(74) Attorney, Agent, or Firm—Cesari and McKenna, LLP; A. Sidney Johnston

(57) ABSTRACT

A method for computing an ACK timing interval for an ACK timer in a protocol layer LLC type 2 session first measures a time interval between transmission of a frame by a source computer joined to a to a destination computer by an intermediate link, and receipt of a corresponding acknowledgment frame by the source computer from the destination computer. The two events at the source computer, starting a timer upon commencement of transmission of a frame or sequence of frames and the later reception of an acknowledge message indicating receipt of those frames, permits calculation of a measured time interval. The measured time interval is used to compute the bandwidth of the intermediate link. The required ACK timing interval for the ACK timer is then computed in response to the bandwidth, the number of bytes transmitted after starting the ACK timer, and the return time for an acknowledgment message. The ACK timing interval may be recomputed after every transmission of frames and receipt of a corresponding ACK message. The ACK timing interval is thereby dynamically adjusted to conditions on the intermediate link, including natural bandwidth for either a slow or fast link, congestion due to other traffic on the link, etc. The dynamic adjustment of the ACK timing interval prevents inadvertent timeouts of the ACK timer, and so prevents inadvertent breaking of the LLC type 2 reliable transport connection.

15 Claims, 9 Drawing Sheets

OTHER PUBLICATIONS

Tanenbaum, Andrew, *Computer Networks, 3$^{rd}$ edition*, Prentice Hall, 1996, pp. 28–35, 35–39.

Tanenbaum, Andrew S., *Computer Networks, Second Edition*, Prentice Hall, 1998, pp. 253–268.

Comer, Douglas E., *Computer Networks and Internets*, Prentice Hall, 1997, pp. 239–249.

Comer, Douglas E., *Internetworking with TCP/IP, vol. 1, Third Edition*, Prentice Hall, 1995, pp. 89–107.

* cited by examiner

|  | 1 | 2 | 3 | 4 | 5 | 6 | 7 | 8 | 9 | 10-16 |
|---|---|---|---|---|---|---|---|---|---|---|
| FIG. 5A | 0 | N(S) | | | | | | | P/F | N(R) |
| FIG. 5B | 1 | 0 | S | S | X | X | X | X | P/F | N(R) |
| FIG. 5C | 1 | 1 | M | M | P/F | M | M | M | | |

IEEE 802.2 LLC FIELDS USING SNAP SAP OPTION

ADAPTIVE TIMER FOR LLC TYPE 2 RELIABLE TRANSPORT IN A COMPUTER NETWORK

FIELD OF THE INVENTION

This invention relates to communications over a computer network, and more particularly to the use of timing events to detect loss of a frame.

BACKGROUND OF THE INVENTION

When a frame is transmitted over a computer network there is a possibility that it will be lost. Loss of a frame can be due to a number of factors. The factors include: failure of an intermediate link; congestion in the network; failure of a bridge or router; aborted frames in the network; cyclic redundancy check (CRC) errors; etc. In order to compensate for lost frames during transmission from a source station to a destination station, over a computer network, it is a common practice to transmit an acknowledge message (ACK message) by the destination station upon receipt of an information frame, or a sequence of frames. The ACK message usually gives the sequence number of the last correctly received frame, and may be either a separate short frame or may be "piggybacked" on an information frame traveling upstream from the destination station to the source station.

Also, an acknowledgment timer (ACK timer) is operated in the source station. The ACK timer is started when the frame is transmitted onto the network (usually at the beginning of the transmission). In the event that an ACK message is not received before the expiration of the ACK timer, then it is a common practice to have the source station either retransmit the information frame, or depending upon the protocol, transmit a poll frame to the destination station. The destination station, upon receipt of the poll frame, is required to transmit a response to the source station. The purpose of the poll frame and the response frame is for the source station to learn: whether or not the destination station is still operative on the network; if the route in a source route bridged (SRB) network is still operative; retrieving the sequence number of the last correctly received frame; etc.

A problem with operating an ACK timer in the source station is that delays in the network can cause the ACK timer to expire before the source station receives an acknowledgment frame from the destination station.

Logical Link Control Layer (LLC) reliable communication was introduced; and sequence numbers for frames along with acknowledgment (ACK) messages permit establishment of reliable communication in layer 2 of the OSI communications reference model. LLC reliable communication is referred to as "LLC type 2" reliable communication. When introduced, LLC type 2 reliable communication was established between end stations on IEEE 802.5 token ring networks, and their extension with bridges to source route bridged (SRB) networks. A fixed time timing interval for ACK messages was appropriate for uncongested small SRB networks. Later, introduction of wide area network (WAN) links in SRB networks along with development of congestion problems at bridges in SRB networks lengthened the packet travel time in the networks, and lead to time-out problems in the ACK timer.

In LLC type 2 reliable communication the source station inserts a sequence number in a field of the LLC type 2 header (in an exemplary version of the IEEE standard three (3) bits are designated for the sequence number, in another exemplary version of the IEEE standard seven (7) bits are designated for the sequence number). In some point-to-point protocols the LLC TYPE 2 function in the LLC layer can read the sequence numbers of received packets, and can request retransmission of packets which are missing. The LLC TYPE 2 fields of a frame are fully disclosed by Radia Perlman in her book *Interconnections, Bridges and Routers*, published by Addison Wesley Publishing Company, in 1992, all disclosures of which are incorporated herein by reference, particularly at pages 33–34. As explained by Perlman at page 34, LLC type 2 reliable communication makes use of four packet types: I packets; RR packets; RNR packets; and, REJ packets:

"1. I (stands for "information") is a data packet. In this case, the CTL [control] field is 2 bytes long and includes 7 bits of sequence number for the data packets being transmitted from source S to destination D, plus 7 bits sequence number for the acknowledgment for packets being received from D by S.

2. RR ("receive ready") is an acknowledgment. It contains a sequence number and indicates that all packets with sequence numbers lower than that have been received. It also indicates that the receiver is prepared to receive more data.

3. RNR ("receive not ready") is an acknowledgment for previously transmitted packets (with numbers lower than the sequence number in the receive sequence number field in the RNR), just like the RR. However, it also indicates that the receiver is temporarily busy and that further packets should not be transmitted until the receiver indicates it can accept new packets, by transmitting an RR.

4. REJ ("reject") indicates that the receiver is requesting retransmission of packets starting with the number in the receive sequence number field."

An ACK timer in the source station is started each time transmission of a sequence of packets is begun by the source station, and the ACK timer expires after an "ACK timing interval". The source station anticipates receiving a response frame (that is, an ACK message), for example a Receive/Ready (RR) frame, acknowledging that the destination station received the preceding sequence of frames. In the absence of receipt of an RR frame during the ACK timing interval, the ACK timer expires and the source station transmits a "poll" frame in order to seek a response from the destination station to indicate whether or not the destination station is still active on the network. Reliable communication of LLC type 2 is described by Andrew Tanenbaum in his book *Computer Networks, Second Edition,* published in 1988, all disclosures of which are incorporated herein by reference, especially at pages 253–257.

However a problem arises when the link round trip time is substantially equal to, or longer than, the ACK timing interval of the ACK timer. The ACK timer may expire before the response, for example the RR frame, is received by the source station. Factors delaying the response frame comprise: the response frame is still on its way from the destination station back to the source station; the frame transmitted by the source station has not reached the destination station because it is stuck in a queue of an intermediate router experiencing congestion; the outgoing frame is still stuck in a queue in the source station and has not been transmitted because the network connected to the source station is congested; etc.

Historically, LLC type 2 reliable communication was introduced to operate over a SRB network where the delays are small and predictable. However, further developments introduced wide area network links into SRB networks having LLC type 2 reliable communication, and so introduced long and variable packet travel times. The long and variable packet travel times give rise to premature expiration of the ACK timer in the LLC type 2 reliable communication protocol.

The premature expiration of the ACK timer causes the source station to transmit a poll frame requesting a response from the destination station. The destination station then receives the poll frame and transmits an acknowledgment response to the poll frame, for example another RR frame. Accordingly, the source station receives two (2) RR acknowledgment frames in succession from the destination station, the first from the properly received sequence of information frames and the second in response to the poll frame. Receipt of two (2) RR acknowledgment frames in succession by a source station is a violation of IEEE 802.2 protocol rules. The violation of the protocol rules causes the source station to terminate the session. Termination of the session due to an inadvertent time-out of the ACK timer is a great inconvenience for users of the network. Presently, the ACK timing interval is manually configured in order to account for low bandwidth communication sessions in the network.

The problem of termination of the session upon receipt by a station of two successive acknowledgment frames remains in the Standard ISO/IEC 8802-2:1988, ANSI/IEEE Std. 802.2, 1998 Edition, (IEEE 802.2) at clause 5.4.2.3.5 "Frame Reject (FRMR) Response", as follows:

"The FRMR (frame reject response) PDU (protocol data unit) shall be used by the LLC in the asynchronous balanced mode (two way communication) to report the observance of a condition, that is not correctable by re-sending the identical PDU, that resulted from the receipt of a PDU from the remote LLC . . . The FRMR response PDU may be used in the case of any or both of the following conditions: The receipt of an unsolicited F bit set to "1" (that is, two ACK messages in succession) . . . The LLC receiving the FRMR response PDU shall pass a DL-RESET indication primitive to the network layer, which is responsible itself for initiating the appropriate mode setting or resetting corrective action by instructing the LLC to initialize both directions of information transfer on the data link connection, using the SABME (set asynchronous balanced mode extended) and DISC (disconnect) (the SABME and DISC commands end the session and a new session must then be established) command PDUs, as applicable."

Also, the IEEE 802.2 Standard at clause 7.7 "FRMR Exception Conditions", action of resetting the session upon receipt of a FRMR response PDU is defined as the LLC layer passing a message up the protocol stack to its supervisory mechanism in the network layer.

The expiration of an ACK timer in the source station for long distance transmissions over Wide Area Networks (WANs) using the TCP/IP protocol has been addressed. Particularly, the use of a time out and retransmission timer using the TCP/IP protocol for WANs is described by Douglas E. Comer in his book *Internetworking with TCP/IP*, *3rd edition*, Vol. 1, published by Prentice-Hall in 1995, all disclosures of which are incorporated herein by reference, particularly at pages 208–216. The TCP/IP protocol is designed for communication over long distances of a Wide Area Network (WAN). There can be large variations in the time required for a packet to travel across a WAN, and Comer shows, at his page 210, sample measurements for Internet round trip times measured for 100 successive IP datagrams traveling across the global Internet; the trip times appear to vary from less than two seconds to more than eight seconds for this particular set of 100 successive IP datagrams.

The TCP/IP protocol is in the transport layer of the Internet model protocol, and also in the OSI communication reference model. The communications reference models are discussed by Andrew S. Tanenbaum in his book *"Computer Networks, 3rd edition"*, published by Prentice-Hall, PTR in 1996, all disclosures of which are incorporated herein by reference, particularly at pages 28–54. In the Internet, or TCP/IP reference model, the layers of the communications reference model comprise: the physical layer at layer 1; above that is layer 2 including the MAC address and, for SRB networks, RIF information; next higher is layer 3 that is the Internet, or IP, layer which provides best effort packet (or datagram) communication; and above that the transport, or TCP, layer 4 which provides reliable communication.

The problem of premature timeout in LLC type 2 reliable transport was addressed by development of the data link switching protocol, DLSw, as explained in RFC 1795 (Internet Engineering Task Force, "IETF", Request For Comments, Informational RFC, RFC 1795, dated April 1995, www.ietf.org), which in Section 2, in relevant part states:

"Data Link Switching was developed to provide support for SNA and NetBIOS in multi-protocol routers. Since SNA and NetBIOS are basically connection oriented protocols, the Data Link Control procedure that they use on the LAN is IEEE 802.2 Logical Link Control (LLC) Type 2. Data Link Switching also accommodates SNA protocols over WAN (Wide Area Network) links via the SDLC [Synchronous Data Link Control] protocol.

IEEE 802.2 LLC Type 2 was designed with the assumption that the network transit delay would be predictable (i.e., a local LAN). Therefore the LLC Type 2 elements of procedure use a fixed timer for detecting lost frames. When remote bridging is used over wide area lines (especially at lower speeds), the network delay is larger and it can vary greatly based upon congestion. When the delay exceeds the time-out value LLC Type 2 attempts to retransmit. If the frame is not actually lost, only delayed, it is possible for the LLC Type 2 procedures to become confused. And as a result, the link may be eventually taken down if the delay exceeds the T1 timer times N2 retry count."

The solution offered by the DLSw protocol option in RFC 1795 is to package the LLC type 2 frames into TCP/IP for transport across a wide area network, or across a slow link. RFC 1795 defines Switch to Switch Protocol (SSP) frame formats to accomplish encapsulating LLC type 2 frames into TCP/IP. Packaging the LLC type 2 frames into TCP/IP packets reduces the size of the network domain over which LLC type 2 reliable transport is implemented, and so shortens the time interval which the source end station must wait before receiving an LLC type 2 acknowledgment message in a return frame. However, the fundamental problem of premature timeout in LLC type 2 reliable transport is not addressed by the DLSw option, and in fact is simply avoided.

Further, some network designs require LLC type 2 reliable communication from end station to end station, without a DLSw link. In these designs the problem of premature expiration of the ACK timer remains a problem, especially where WAN links or congested intermediate routers or bridges are included within the span of the LLC type 2 reliable communication.

There is needed a mechanism to prevent inadvertent time-outs of the ACK timer in communications between a source station and destination station using LLC type 2 reliable transport, especially when a slow link is employed for the connection, and also when the session bandwidth is subject to dynamic variations during day to day operations.

SUMMARY OF THE INVENTION

A method for computing an ACK timing interval for an ACK timer in a protocol layer LLC type 2 session first measures a time interval between transmission of a frame by a source computer joined to a destination computer by an intermediate link, and receipt of a corresponding acknowledgment frame by the source computer from the destination computer. The two events at the source computer: i.e., starting a timer upon commencement of transmission of a frame or sequence of frames and the later reception of an acknowledge message indicating receipt of those frames, permits calculation of a measured time interval. The measured time interval is used to dynamically compute the bandwidth of the intermediate link. The required ACK timing interval for the next ACK timer is then computed in response to the dynamically computed bandwidth and the number of bytes to be transmitted and subsequently acknowledged. The ACK timing interval may be recomputed after every transmission of frames and receipt of a corresponding ACK message. The ACK timing interval is thereby dynamically adjusted to conditions on the intermediate link, including natural bandwidth for either a slow or fast link, congestion due to other traffic on the link, etc. The dynamic adjustment of the ACK timing interval prevents inadvertent timeouts of the ACK timer, and so prevents inadvertent breaking of the LLC type 2 reliable transport connection.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 5A–FIG. 5C are block diagrams of LLC control subfields for a packet having a two byte control field.

DETAILED DESCRIPTION OF AN ILLUSTRATIVE EMBODIMENT

Figure 1:
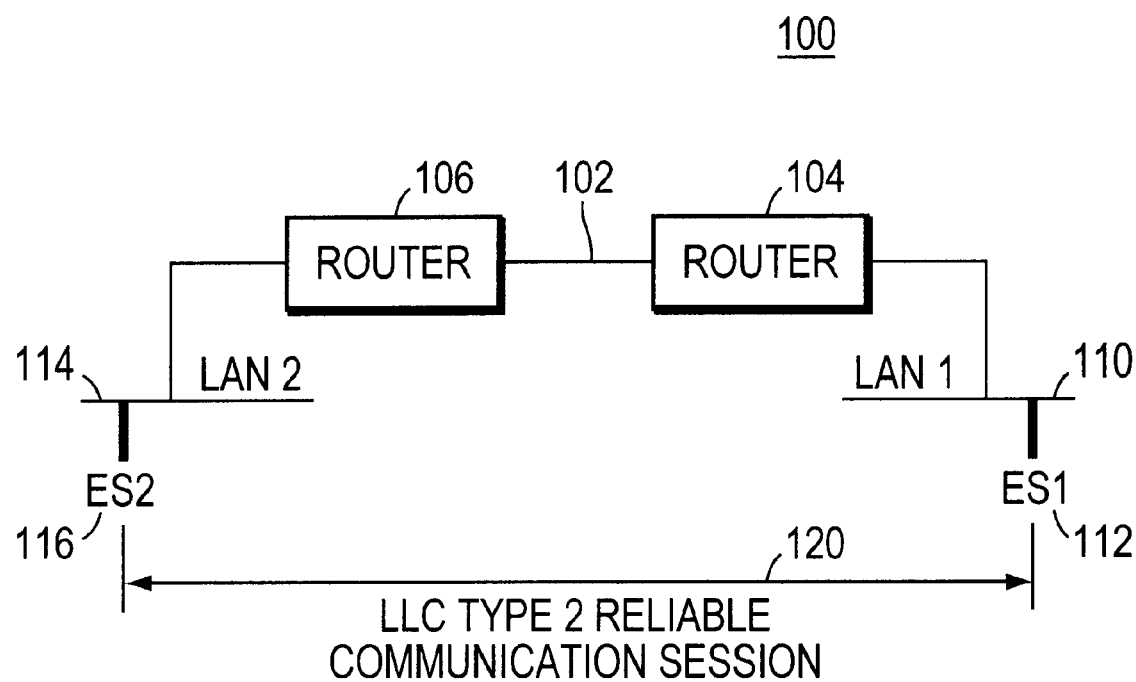
FIG. 1 is a block diagram of a communication system using an LLC2 Type 2 reliable communication session.

Turning now to FIG. 1, block diagram 100 shows a point to point link 102 between two routers 104 106, each of which serves end stations through local area networks (LANs). Router 104 connects to LAN 1 110 and thence to end station ES1 1112. Router 106 connects to LAN 2 114 and thence to end station ES2 116. Communication between end station ES1 112 and end station ES2 114 passes through point to point link 102 between routers 104 106. Arrow 120 indicates that point to point link 102 has established a layer 2 LLC Type 2 reliable communication session. LAN 1 110 may be an IEEE 802.5 token ring, an IEEE 802.3 Ethernet, etc. or a local area network of any convenient type.

Protocols and Fields

Source and destination stations joined by a link for example router 104 and router 106, are often referred to as "link stations". In the present context, a "link" is used in accordance with the definition of a "data link" given in IEEE 802.2, Clause 1.4.2.8 as: "An assembly of two or more terminal installations and the interconnecting communications channel operating according to a particular method that permits information to be exchanged; in this context the term 'terminal installation' does not include the data source and the data sink." Also in the present context, the "data link layer" (DLL) is defined at Clause 1.4.2.9 as: "The conceptual layer of control or processing logic existing in the hierarchical structure of a station that is responsible for maintaining control of the data link. The data link layer functions provide an interface between the station higher layer logic and the data link. These functions include address/control field interpretation, channel access and command PDU/response PDU generation, sending, and interpretation." Further, the "higher layer" is defined at Clause 1.4.2.14 as: "The conceptual layer of control or processing logic existing in the hierarchical structure of a station that is above the data link layer and upon which the performance of the data link layer functions are dependent; for example, device control, buffer allocation, LLC station management, etc." And further, the "logic link control or "LLC" is defined at Clause 1.4.2.17 as: "That part of a data station that supports the logical link control functions of one or more logical links. The LLC generates command PDUs and response PDUs for sending and interprets received command PDUs and response PDUs. Specific responsibilities assigned to an LLC include: (1) Initiation of control signal interchange; (2) Organization of data flow; (3) Interpretation of received command PDUs and generation of appropriate response PDUs, and; (4) Actions regarding error control and error recovery functions in the LLC sublayer." The LLC is a sublayer of the DLL, as shown with reference to FIG. 2.

A LLC Type 2 reliable communication session will now be further discussed with reference to FIGS. 2–9.

Further, terminology which will be used herein is as follows. At the physical layer, bits are transmitted by a source station onto the network. A frame is forwarded in a subnet according to the layer 2 MAC address from a source station to a destination station, and may be forwarded by several bridges. A packet is routed by a router according to a layer 3 address in an IP header, and may be routed from a subnet to, for example another subnet, to a wide area network, to a point to point link to another router, etc. This distinction between a frame and a packet is fully disclosed by Andrew Tanenbaum in his book *Computer Network, 3rd edition*, published by Prentice Hall Publishing Company in 1996, all disclosures of which are incorporated herein by reference, especially at pages 28–34. Further, the term "message" will be used generally to indicate a transfer of information between computers, and may include a file transfer of many megabytes requiring many packets and many frames, or may refer to a single frame, for example a single frame carrying flow control information upstream to a source station.

The distinction between a frame and a packet has the following addressing characteristics. A frame has the MAC (layer 2) destination address and the IP (layer 3) destination address of the same end station, the intended destination end station. The destination end station is either on the same local area network, or the same subnet formed by bridges between local area networks, as the source end station. However, in contrast, a packet has the MAC address of a router and the IP address of an end station on a distant subnet or other network, and the router routes the packet on its journey to the intended destination end station.

Figure 2:
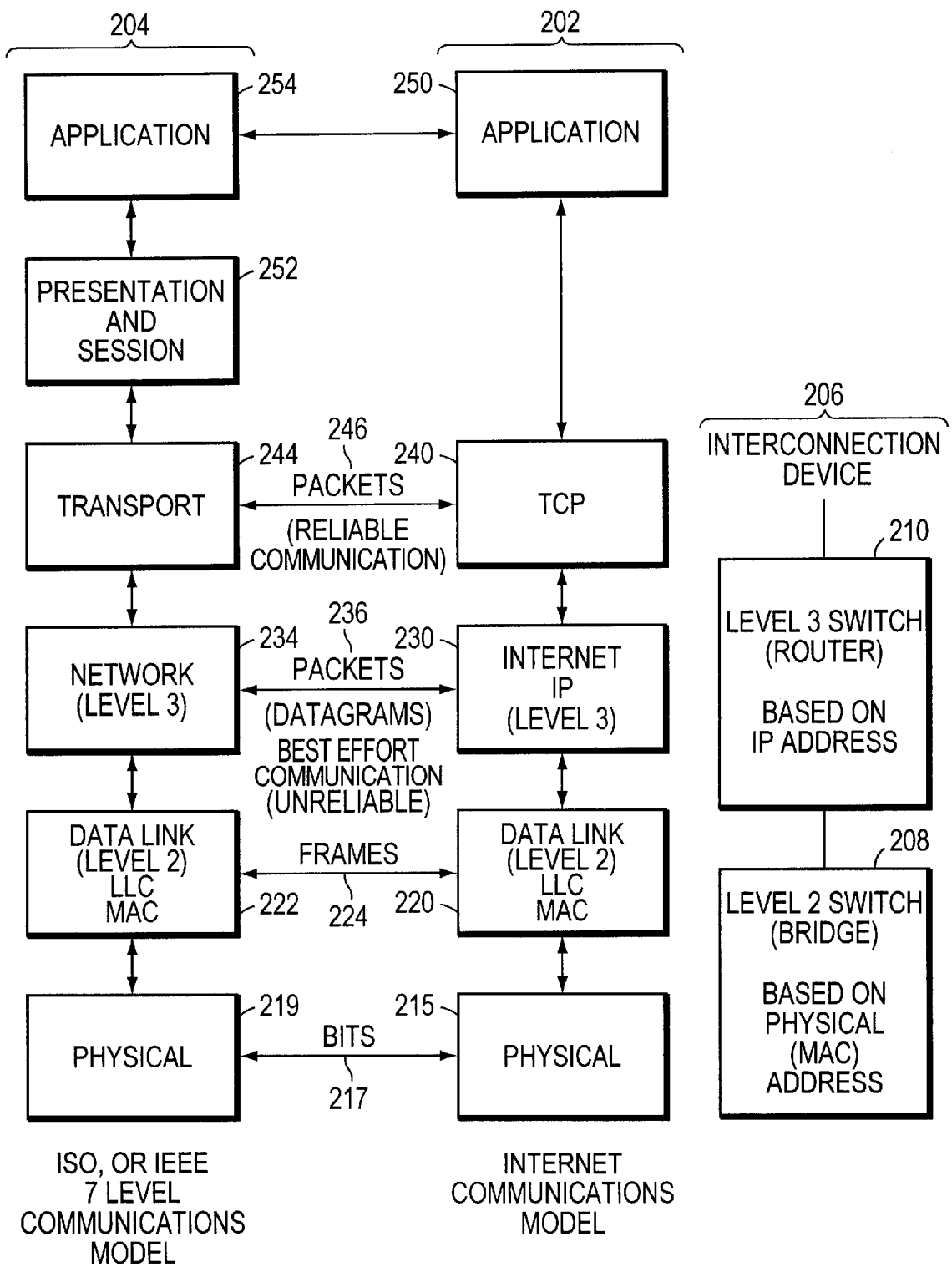
FIG. 2 is a block diagram of communications protocols, and showing interconnecting devices.

Turning now to FIG. 2, the Internet communications model 202 is shown, along with a comparison with the ISO, or IEEE, seven (7) layer communications model 204, and with a representation of the interconnection devices 206 used as a layer 2 switch 208 (also known as a bridge) and as a layer 3 switch 210 (also known as a router). At the physical layer, box 215 of the Internet communications model, bits are exchanged by a source station (not shown) and a destination station (not shown). Arrow 217 shows the correspondence between the physical layers of the two models, box 215 and box 219, and also shows that the physical layers exchange bits over the connection medium (for example, electrical, fiber optics, optical, etc.).

The data link layer (DLL layer) of the Internet model of communications is represented by block 220. The corresponding DLL layer of the ISO/IEEE model is box 222. Arrow 224 indicates that frames are exchanged by two stations at layer 2 of both the Internet communications model and the ISO/IEEE model. The data link layer has a lower MAC sublayer (medium access control) and an upper LLC sublayer (logical link control). The LLC layer is more fully disclosed in IEEE standard 802.2, all disclosures of which are incorporated herein by reference. Fields which are recognized and acted upon by a receiving station, as the frame is received, are discussed hereinbelow. The layer 2 MAC and layer 2 LLC sublayers respond to corresponding fields in frames, where the fields are designated MAC and LLC fields, respectively. Three (3) types of LLC frames are defined by the IEEE 802.2 standard. Type 1 is best effort, or unreliable, operation. Type 2 is acknowledged reliable operation, where ACK messages and packet sequence numbers are used to cause re-transmission of lost frames. Type 3 is an acknowledged connectionless operation.

Layer 3 of the Internet communications model is represented by block 230, the IP layer of the Internet protocol. The corresponding layer of the ISO/IEEE model, the "network" layer, is shown by block 234. Layer 3 devices respond to layer 3 fields in a frame. In the event that the IP destination address in the frame (a layer 3 field) is for an end station and the MAC destination address (a layer 2 field) is for an intermediate router, the frame is referred to as a "packet". Arrow 236 indicates that packets are exchanged between layer 3 entities of the communications model, that is between layer 3 in the source station and the destination station. Alternatively, the term "datagram" is used to refer to packets exchanged between layer 3 entities in source and destination stations, as shown at arrow 236, however the term "packet" will be used herein. In communication between stations, either on a single local area network, or separated by half the circumference of the Earth with many hops between source and destination stations, packets are exchanged at layer 3 as a best effort communication, and so provide unreliable communication.

Block 240 represents the TCP (transmission control protocol) layer of the Internet communications model. The corresponding layer of the ISO/IEEE model is the "transport" layer, represented by block 244. Arrow 246 indicates that reliable packet communication is established by the TCP protocol. ACK messages are used to tell the IP layer to re-transmit lost packets.

In the Internet communication model 202, the reliably received packets are passed up to the application layer as represented by box 250. In the ISO/IEEE model 204, the reliably received packets from the transport layer at block 244 are passed through two additional layers, the session layer and the presentation layer, and then finally to the application layer 254. Application layer 254 of the ISO/IEEE model corresponds to the application layer 250 of the Internet model. For example, the application layer may represent an e-mail computer program, or may represent a file transfer computer program, or may represent transfer by a browser computer program of a web page from a server to a client, etc.

The various higher layers of the Open System Interconnect (OSI) reference model are described by Andrew S. Tanenbaum in above-mentioned book, *"Computer Networks, 3rd edition"*, particularly at pages 28–35. The Internet reference model, or the TCP/IP reference model, is also discussed by Tanenbaum at pages 35–39.

Figure 3:
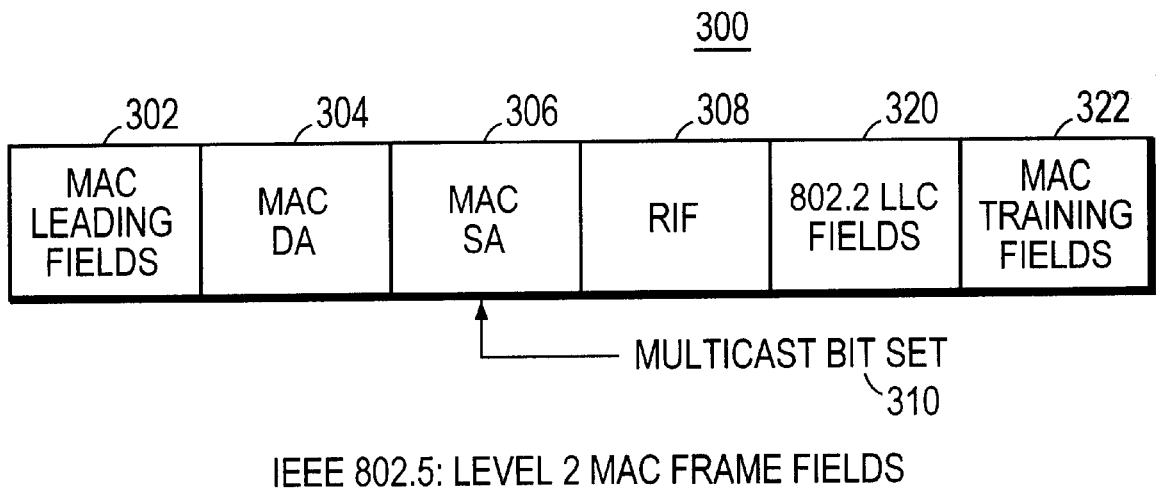
FIG. 3 is a block diagram of a layer 2 MAC frame.

Turning now to FIG. 3, layer 2 fields for a token ring local area network as defined by IEEE standard 802.2 are shown. Fields of the frame which are transmitted first and arrive first at the destination station are shown in block 302 as "MAC leading fields". The layer 2 or MAC destination address is given in field 304. The layer 2 or MAC source station address is given in field 306. The receiving station knows to look for the Route Information Field, RIF field, 308 by determining that the "multicast bit" in the MAC source address field, MAC SA field 306, is "set". Alternatively, in the event that the frame 300 is a transparently routed frame, the multicast bit in the MAC SA field 306 is "clear".

Fields to which the LLC sublayer of the DLL layer 220 respond are shown in field 320. Trailing fields of the MAC frame are shown as field 322, and under some protocols comprise a frame check sequence which is used to determine the integrity of the received frame.

Figure 4:
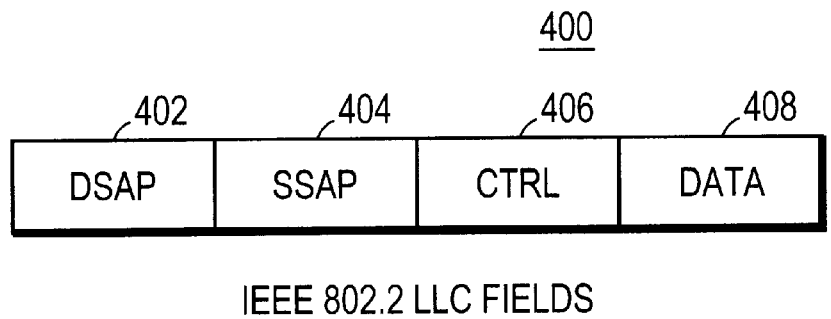
FIG. 4 is a block diagram of IEEE 802.2 LLC fields.

Turning now to FIG. 4, a first exemplary embodiment of LLC fields 320 are shown. Field 402 is a destination station access point field (DSAP field). Field 404 is a source station access point field (SSAP field). Field 406 is a control field (CTRL field). Values in these fields control how the LLC layer handles the frame. Field 408 is the data field, and comprises the data which it is desired to transport over the computer network and, also various header fields for higher layers of the protocol.

Control field CTRL 406 is, for example, either one (1) or two (2) bytes long depending upon the type of control field. Turning now to FIG. 5, three exemplary embodiments of a two byte long control field 406 are shown. The bits are numbered in row 502.

When bit "1" is set to the value "0", the packet is an "I" packet, or information transfer protocol data unit (PDU), as shown in FIG. 5A. Bits "2–8" then carry seven (7) bits of sequence number of the present packet. Bit "9" is the "poll" or "final" bit, the P/F bit, as will be described in more detail hereinbelow. Bits "10–16" carry seven (7) bits of sequence number showing the frames received from the present destination station in a reverse traffic flow, the "receive sequence number" field. Accordingly, the sequence numbers can count up to 128 packets or frames, and can have up to this number of outstanding frames before requiring an acknowledgment. Accordingly, the information, or I frame, has a two byte control field 406.

As shown in FIG. 5B, when bit "1" is set to the value "1", and bit "2" is set to the value "0", the packet is a supervisory commands/response packet, that is it is a "S format PDU" under the IEEE 802.2 standard. Bits "3–4" identify the type of S format PDU and may indicate: "RR" receive ready; "RNR" receive not ready; or "REJ" reject, as described hereinbelow. Bit "9" is the "poll" or "final" bit, the P/F bit, as will be described in more detail hereinbelow. Bits "10–16" carry the seven (7) bits of the "receive sequence number" field. Thus, the S format PDU has a two byte CTRL field 406.

When bit "1" is set to value "1" and bit "2" is set to value "1" then the packet is an unnumbered command response PDU, "U format PDU". Bits "3–4" along with bits "6–8" give the type of packet, and may indicate: "SABME" set asynchronous balanced mode extended, for two-way communication between the two end stations; DISC for requesting a disconnect; UA unnumbered acknowledgment, acknowledging receipt and acceptance of a DISC or SABME message; DM reports status that the LLC is logically disconnected from the data link connection; FRMR, indicates receipt of an invalid packet such as an out of sequence packet or a packet with an unsolicited "F" bit set to value "1", followed by the station issuing either a DISC or SABME command in order to break the session so that a new session may be established at the LLC layer. Thus, the U format PDU has a one byte CTRL field 406.

LLC fields as disclosed herein in FIG. 4 and FIG. 5 are disclosed in greater detail in the ANSI/IEEE standard ISO/IEC 8802-2, also ANSI/IEEE Standard 802.2, Third Edition, 1998-05-07, Logical Link Control, all disclosures of which are incorporated herein by reference.

Figure 6:
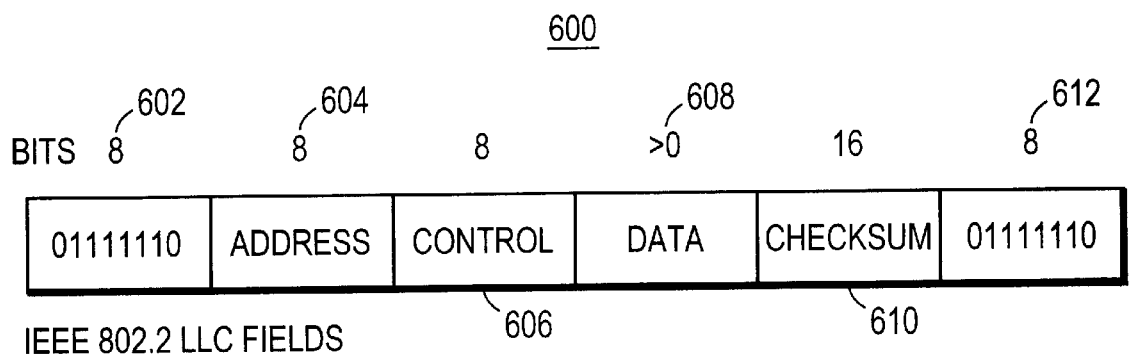
FIG. 6 is a block diagram of an IEEE 802.2 LLC fields having a one byte control field.

In an alternative embodiment of the invention, as shown in FIG. 6 alternative LLC fields 600 of field 320 are shown. Field 602 and field 612 are one byte flag fields as leading and trailing fields respectively, and contain the 8 bit sequence "01111110". Field 604 is a one byte address field which may be used, for example, to identify different sessions. Field 606 is a one byte control field which will be discussed hereinbelow with reference to FIG. 7A–FIG. 7C. Field 608 is a data field of arbitrary length, and may be zero bytes length. Field 610 is a two byte checksum field providing a cyclic redundancy check. The fields of FIG. 6 are fully disclosed by Andrew S. Tanenbaum in his book *Computer Networks, Second Edition,* published by Prentice Hall in 1988, all disclosures of which are incorporated herein by reference, especially at pages 253–268.

Figure 7A:
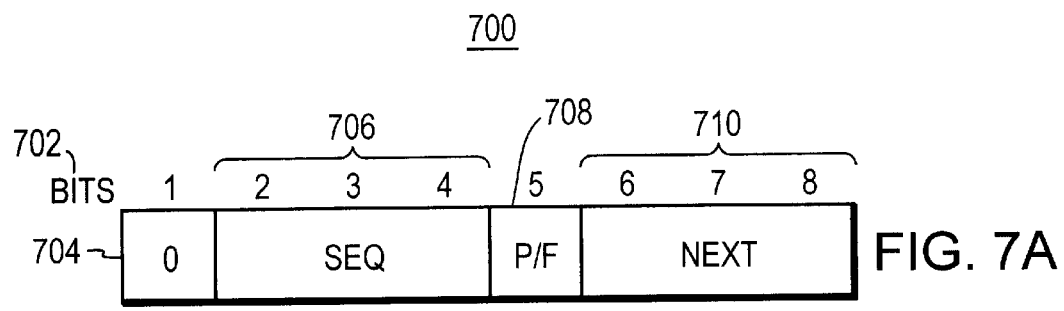
FIG. 7A–FIG. 7C are block diagrams of subfields of a one byte LLC control field.

Turning now to FIG. 7A, detail of subfields of the one byte control field 606 are shown. The bit numbers are shown in row 702. Three types of one byte control fields 606 are shown.

The first type 704 has bit "1" set to value "0", and provides an information packet with a sequence number of three (3) bits carried in bits "2–4", SEQ field 706. Accordingly, the sequence number can count from "0" to "7", and up to eight (8) unacknowledged information frames are permitted. Bit 5 is the P/F field 708, that is the "poll or final" bit. In an alternative embodiment, all packets (or frames) sent by a station, except for the final one, have the P/F bit set to equal "0". The final one is set to equal "1". In further alternative embodiments, the P/F bit is used to force the other machine to send a supervisory frame immediately rather than wait for reverse traffic to piggyback the window information. Finally, bits 6–8 are the NEXT field 710 and carry a sequence number piggybacked on an information frame indicating the last frame received correctly on a reverse traffic flow. The receiving station is required to retransmit frames in response to the value of the sequence number in NEXT field 710. The important point for the present disclosure is that control fields as disclosed in FIG. 7 carry three (3) bit sequence numbers, and so can count only up to eight (8) frames before receiving an acknowledgment.

Figure 7B:
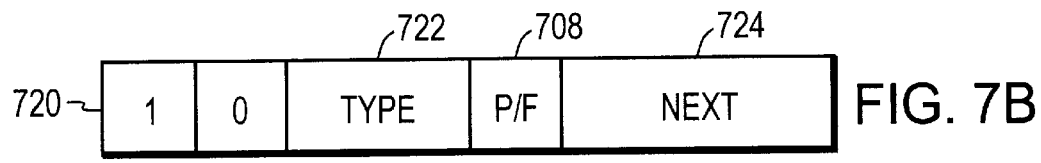

Turning now to FIG. 7B, control field 720 has bit "1" set to value "1" and bit 2 set to value "0". Bits "3–4" are the type field 722. Bit 5 is P/F field 708, where the previous reference numeral is maintained to indicate the same functionality for the P/F bit. NEXT field 724 carried in bits "6–8" carries sequence number information. Type field 722 may have the following values.

Type "0" (for example, "00" in bits 3–4 of type field 722) is a RECEIVE/READY or RR frame, and may be used to indicate the next frame expected. The RR frame may be used when there is no reverse traffic to use for piggybacking the sequence number information carried in NEXT field 724. Again, the receiving station may be required to retransmit frames in response to the sequence number in NEXT field 724.

Type "1" (for example "01" in field 722) is the REJECT frame, or negative acknowledgment frame. NEXT field 724 then, in an exemplary embodiment, carries the sequence number of the frame which was not correctly received, that is the first frame which must be retransmitted.

Type "2" (for example ("10" in field 722) is the RNR or RECEIVE NOT READY field. The RNR frame acknowledges all frames up to, but not including the one with sequence number in NEXT field 724, just like the RR frame, but tells the sender to stop sending frames. The RNR frame may, for example, be used to indicate that the receiver has a shortage of buffers.

Type "3" (for example "11" in field 722) is the SELECTIVE REJECT frame and, for example, may call for retransmission of only the frame specified by sequence number in NEXT field 724, or in other protocols which do not support selective reject may be undefined.

Figure 7C:
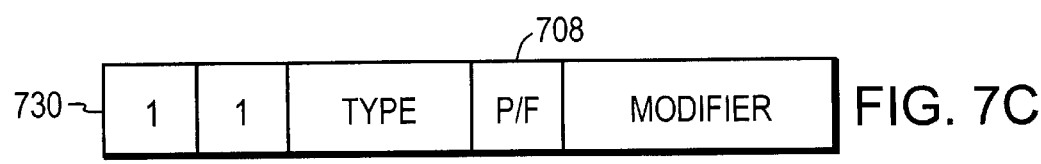

Turning now to FIG. 7C, an Unnumbered frame 730 is shown. Bits 3, 4, 6, 7, and 8 are available to define control functions. For example, the protocol may define a number of commands such as: a disconnect command DISC, which indicates that a machine wishes to break the session; a SNRM command which resets the session and forces all sequence numbers back to zero; SABM or set asynchronous balanced mode which resets the line and declares both parties to be equals; Fit, or frame reject, indicating that a frame with a correct sequence number but incorrect semantics; UA which acknowledges unnumbered control frames, and-since only one control frame is permitted to be outstanding at a time, there is not expected to be any ambiguity (unless a control frame is retransmitted due to some error); and, additional control types may be used in various exemplary embodiments of the invention.

Figure 8:
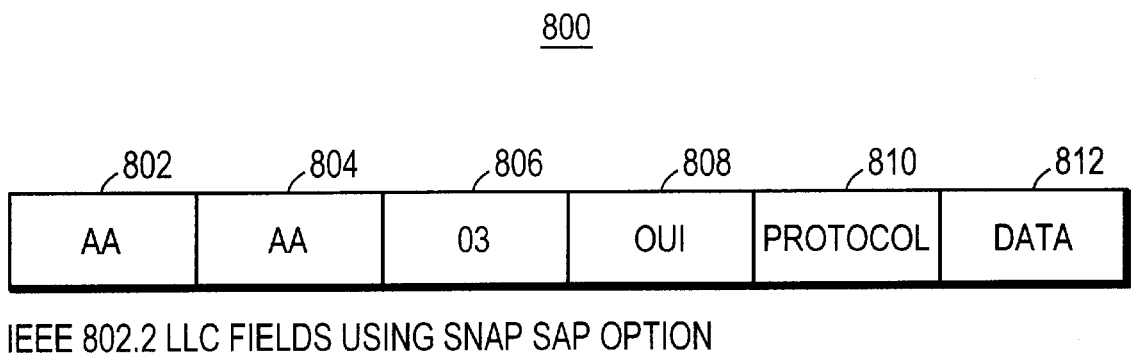
FIG. 8 is a block diagram of IEEE 802.2 LLC fields for the SNAP SAP option.

Turning now to FIG. 8, the subnetwork access protocol option 800 for LLC fields is shown. Protocol option 800 is referred to as the subnetwork access protocol of the service access point (SNAP SAP) protocol. In an alternative embodiment of the invention, a frame using the SNAP/SAP protocol option may be used to provide reliable transport in the LLC layer of the data link layer (DLL) in layer 2 of the Internet protocol, the IEEE or ISO communications model, etc.

The first two fields 802 and 804 contain the characters "aa". The third field 806 contains the characters "03". The fourth field 808 contains an organizational unique identifier (OUI). The OUI in field 808 is usually, for example, assigned by a controlling organization such as the IEEE to a manufacturer. The manufacturer then designs his/her equipment to operate with protocols which he/she defines. A receiving station reads the OUI in field 808, and if it understands the value it reads, then it responds to the contents is of the protocol field 810. Protocol field 810 identifies protocols defined by manufacturers specified by the OUI field 808. In the event that the receiving station reads the OUI in field 808 and does not understand the OUI because it was made by another manufacturer, then the receiving station simply ignores the contents of the protocol field 810. Data field 812 corresponds to the data field 408, and comprises headers for higher layer protocols and the "real" data which is being sent across the computer network. For example, a manufacturer designated by the OUI in field 808 may design protocol field to carry sequence number information, and also acknowledgment information. By the use of these sequence number and acknowledgment fields, along with an ACK timer in the source station, the manufacturer may define a reliable transport protocol. Still, the timing interval of the ACK timer must be established.

Figure 9:
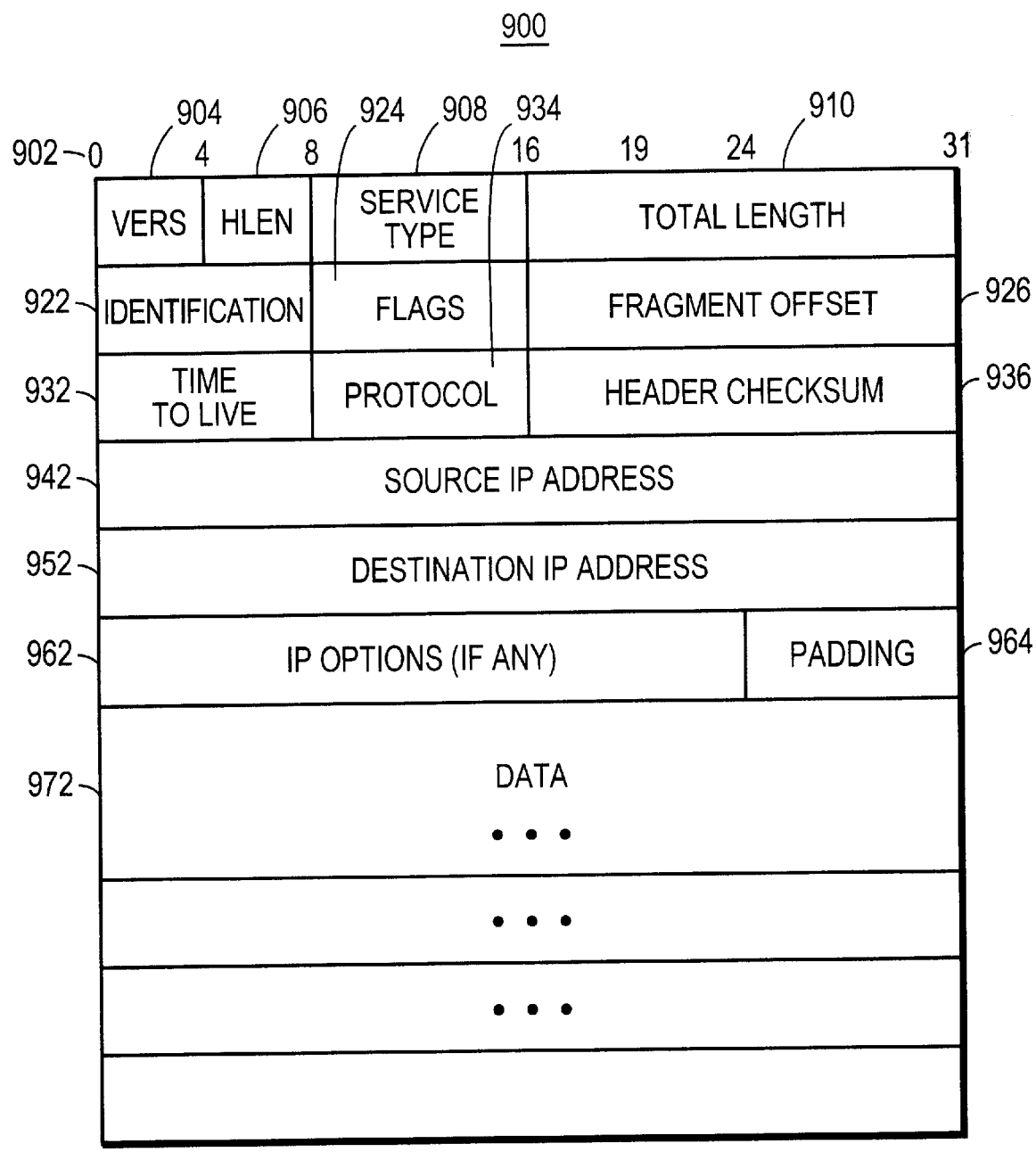
FIG. 9 is a block diagram of a layer 3 IP header.

Turning now to FIG. 9, an exemplary layer 3 packet format is shown under IP version 4. (An alternative exemplary IP packet is defined in IP version 6, as fully disclosed by Douglas E. Comer in his book *Computer Networks and Internets*, published by Prentice Hall, in 1997, all disclosures of which are incorporated herein by reference, especially at Chapter 18, pages 239–249.) The fields of the exemplary embodiment shown in FIG. 8 are 32 bits across, as shown by numbers in row 902. Field VERS 904 contains the version number of the IP protocol used to create the packet. For example, detailed organization of the layer 3 fields may depend upon the version number, however the following exemplary organization of the packet layer 3 fields is given as an illustrative embodiment of layer 3 design. Field 906 HELN contains the header length. Field 908 SERVICE TYPE specifies a type of IP service. Field 910 TOTAL LENGTH specifies the length of the packet. IDENTIFICATION FIELD 922, FLAGS field 924 and fragment offset field 926 aid in reassembly of fragmented packets. TIME TO LIVE field 932 gives an expiration time for the packet. PROTOCOL field 934 specifies the format of the DATA field 972. HEADER CHECKSUM field 936 ensures integrity of transmission of the header. SOURCE ADDRESS field 942 contains the IP layer 3 address of the source station. DESTINATION ADDRESS field 952 contains the IP layer 3 address of the destination station. IP OPTIONS Field 962 and padding field 964 contains options, if any, and padding. DATA field 972 contains the real data being transported over the computer network. IP layer 3 headers for IP version 4 are more fully disclosed by Douglas E. Comer in his book *Internetworking with TCP/IP, Volume 1, third edition*, published by Prentice Hall in 1995, all disclosures of which are incorporated herein by reference, particularly at pages 89–107.

Timing Sequences

Figure 10:
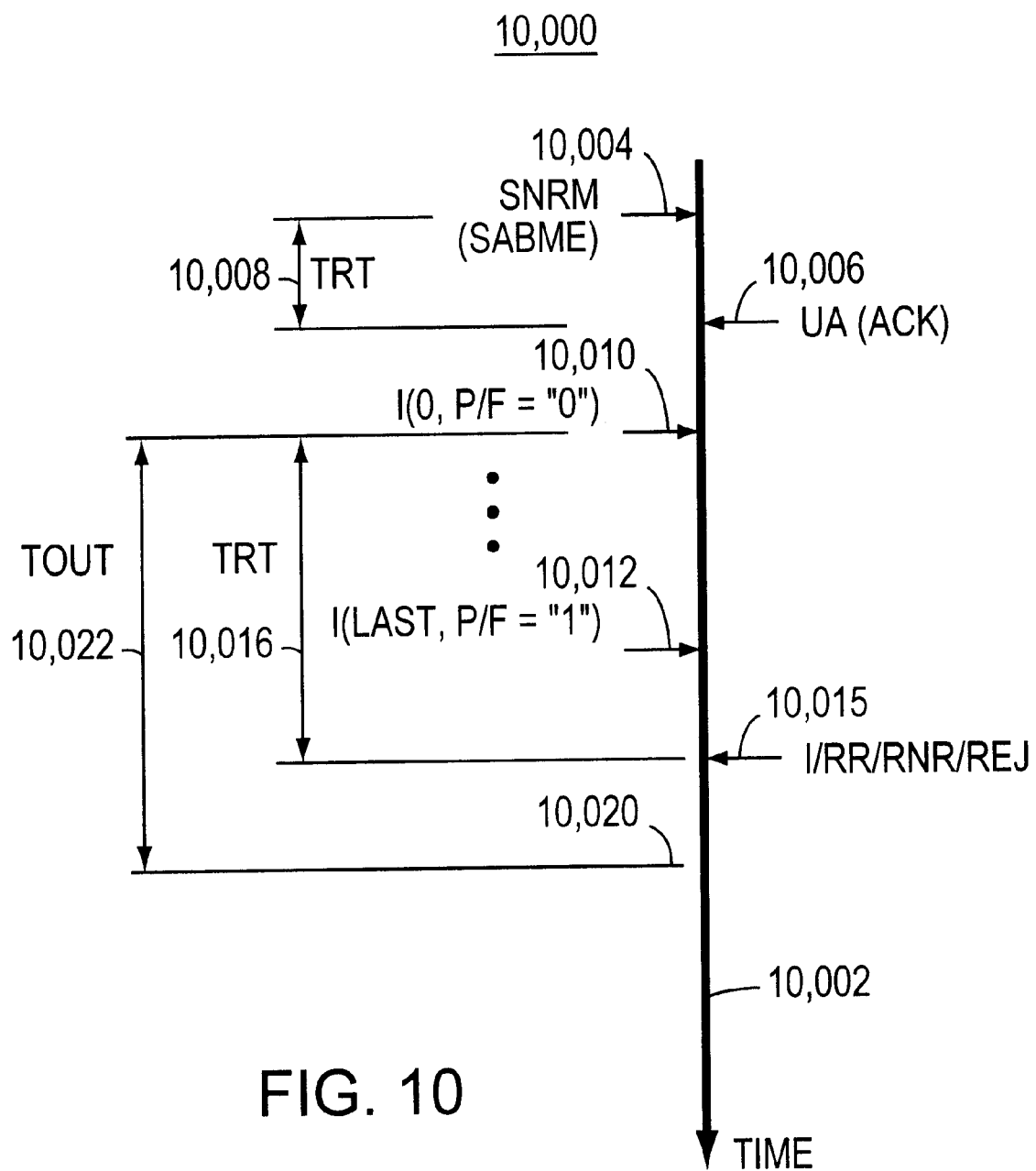
FIG. 10 is a timing diagram for operation of a LLC type 2. reliable transport in accordance with the invention.

Turning now to FIG. 10, a timing sequence diagram 10,000 for the invention is shown. Line 10,002 is a time line, and provides an ordering of a sequence of events during time. At time 10,004 the session between router 104 and router 106 is established over communication link 102. In an exemplary embodiment of the invention router 104 is taken as the source machine and the router 106 is taken as a destination machine. The session begins at time 10,004 by router 104 transmitting a "session start indicating frame" (SNRM, SABME, etc.) over communication link 102 addressed to router 106, and also source router 104 starting its ACK timer. Router 106 responds to receipt of the "session start indicating frame" (a SNRM, a SABME, etc. frame), and transmits an acknowledgment message to router 104, for example a UA message as shown in FIG. 10, which router 104 receives at time 10,006. Time interval 10,008 is the time measured by router 104 between the event of beginning transmission of the "session start indicating frame", at time 10,004 and a receipt of the acknowledgment frame at time 10,006. Receipt of the acknowledgment frame includes verifying the checksum of the acknowledgment message to insure that the frame is not corrupted. Time interval 10,008 is equal to the round trip time along link 102 for the total number of bytes in the "session start indicating frame", and also includes: any time spent by the destination router as it decides what to do with the received frame before starting transmission of an acknowledgment message; the time required to transmit the acknowledgment message, etc., and is set equal to the Two way Round Trip time (TRT) 10,008. In the event that the ACK timer is started when transmission of a frame is started, time interval 10,008 includes: the time required to transmit the downstream bytes of the frame; the time required for the last bit transmitted to arrive at the destination station; the time for the checksum to be verified by the destination station; the time required for the destination station to process the frame and to decide to transmit an acknowledgment message; the time required to actually transmit the acknowledgment message; and, the time required by the source station to process the acknowledgment message and halt the ACK timer, etc. In this exemplary embodiment of the invention, the ACK timer is started at the beginning of transmission of the "session start indicating frame" at time 10,004, and the acknowledgment frame is not "received" until it is fully received by the source station and its checksum verified by the receiving station. The two way round trip time (TRT) is used by the invention to compute a time-out interval TOUT for the ACK timer maintained in router 104.

Beginning at time 10,010, router 104 begins transmitting information frames (I frames). In a first exemplary embodiment of the invention, control field 406 is a two byte control field. Control field 406 has, in accordance with FIG. 5A, bit "1" set to equal "0". The first, and subsequent frames, but not the last frame, have their "P/F" bit 510 (bit 9) set to equal "0". At time 10,012 transmission of the last information frame in the sequence is completed by router 104, and with the P/F bit 510 (bit 9), set to equal "1", the indicator that this is the last information frame. The parameter "last" for a two byte control field 406 which has an eight (8) bit sequence number, may be as large as 127, meaning that 128 frames may be transmitted before waiting for an ACK. That is, the parameter "last" in the frame indicator I(last, P/F="1") shown in FIG. 10 at time 10,012 may be as large as 127.

In the alternative exemplary embodiment of the invention implementing a one byte control field 406, as shown in FIG. 6 and FIG. 7A–FIG. 7C, only three (3) bits are used in the frame sequence field. With only three (3) bits of sequence number, the parameter "last" may have a maximum value of seven (7), before waiting for an ACK. So, in a one (1) byte implementation of control field 406, a three (3) bit sequence number leads to the largest value of the parameter "last" of seven (7). That is, only eight (8) frames may be transmitted before waiting for an ACK. In any event, the last frame transmitted must have its P/F bit set equal "1" in field 708 as an indicator to the destination station that this is the last information frame which will be transmitted until an ACK is received by the source station.

The destination router 106 responds to receipt of the field 510 or field 710 with the P/F bit set to "1", the "P" value, by transmitting an acknowledgment frame (for example, an I frame, a RR frame, a RNR frame, a REJ frame) and that acknowledgment frame is received by source router 104 at time 10,015. For example, the acknowledgment may be in a separate UA message, or it may be piggybacked on an information frame. ACK sequence number information is carried in the two byte control field in bits 512 (bits 10–16) of FIG. 5A, or in a one byte control field as shown with reference to FIG. 7A in bits 710 (bits 6–8).

Source router 104 measures the time interval between the beginning of transmission of the first frame at time 10,010 and the receipt of the acknowledgment frame at time 10,015, as time interval 10,016. Again, time interval 10,016 is the round trip time, and is indicated as the two way round trip time interval TRT between router 104 and router 106. Both events, time 10,010 and time 10,015 defining the time interval TRT occur at router 104, and so router 104 measures the two way trip time on link 102. Time interval TRT 10,016 is used, in combination with time interval TRT 10,008, along with other measurements of the round trip time between router 104 and router 106, to compute the time-out interval for a retransmission timer (or ACK timer) maintained in router 104. The time out interval is represented by the symbol "TOUT". The ACK timer would expire after a time interval TOUT at time 10,020, however the ACK timer is halted by source router 104 at time 10,015 when the ACK response is received.

For example, the frame whose transmission ends at time 10,012 may be the seventh frame in a one byte implementation of the control field 406. Or for example, the frame may be a lesser number than seven if the source router 104 had fewer frames to transmit in the session. Alternatively, in a two byte implementation of control field 406 the frame whose transmission ends at time 10,012 may be up to the 128th frame transmitted (parameter "last" set to equal 127).

The formula used to compute the time out interval TOUT 10,022 of the ACK timer of router 104 is given as follows: first, the time interval TRT measured from time interval 10,008 or time interval 10,016 measured at an earlier successful communication session, is used in the following expression to calculate the bandwidth "A" of communication link 102:

$$A(bytes/sec) = (\text{Number of bytes transmitted})/TRT \quad \text{(Equation 1)}$$

Use of the two way round trip time TRT roughly factors in all of the delays at end stations, and these delays reduce the value of the bandwidth to the value realized in actual practice. The value realized in actual practice is given by Equation 1. The bandwidth A is computed, for example, each time an acknowledgment frame is received from router 106. For example, when the session went active at time 10,004 by the transmission of an "session start frame" by router 104, router 104 expected an acknowledgment frame to be received. This acknowledgment frame was received at time 10,006. Accordingly, the bandwidth A of a system is computed by the above equation.

In the event that there are a sequence of successful transmissions of windows of information frames by source router 104 to destination router 106 (as indicated between time 10,010 and time 10,012), then a succession of values of TRT time interval 10,016 are measured. Each of the succession of measured TRT values can then be used to calculate the bandwidth A of link 102 by use of Equation 1.

In the event that TOUT expires before receipt of an ACK message, then a policy must be established in order to find an acceptable value for TOUT. One such policy is to initialize TOUT to a default value, and in the event that TOUT is too small, to keep doubling it until an ACK message is received. In the event that TOUT is too large, either the default value or after the default value has been doubled one or more times, then the calculation of TOUT in response to measured values of bandwidth A will reduce TOUT to an optimum adaptive value.

As a sequence of values of the bandwidth A of connection link 102 are collected, it is a question of policy as to whether the latest value will be used, a rolling average will be used, or some other combination of a sequence of values of the bandwidth of connection link 102 will be utilized.

The time interval TOUT for the retransmission timer of source router 104 is then calculated by the formula:

$$TOUT(\text{seconds}) = (\text{Number of Bytes in Packets Sent})/A + (\text{time adder for uncertainty}) \quad \text{(Equation 2)}$$

The term "time adder for uncertainty" is added in order to avoid making TOUT just marginally too short. For example, the value of "time adder for uncertainty" may be computed as a percentage of the first term:

$$(\text{Number of Bytes in Packets Sent})A,$$

for example a value such as 1%, 5%, 10%, etc. A percentage may be selected in order to reduce the timeouts to an acceptable fraction of communication session attempts, and small enough to increase utilization of the bandwidth of link 102.

The value of the time out interval TOUT determined from equation 2 is an adaptive ACK timing interval which permits the ACK timer of router 104 to respond to changes in congestion conditions on connection link 102. For example, connection link 102 may carry more traffic than the session between router 104 and router 106 (connections not shown). This additional traffic utilizes bandwidth in connection link 102. This utilization of bandwidth in connection link 102 interferes with transmission of the session 10,000. The amount of "time out" delay TOUT 10,022 required for router 104, accordingly, depends upon the amount of other traffic on connection link 102. The adaptive computation of the time out time interval TOUT 10,022 enables source router 104 to respond to these changes and conditions of the bandwidth of connection link 102.

In the alternative case, as practiced in the prior art, the ACK timing interval TOUT was set by an administrator.

Figure 11:
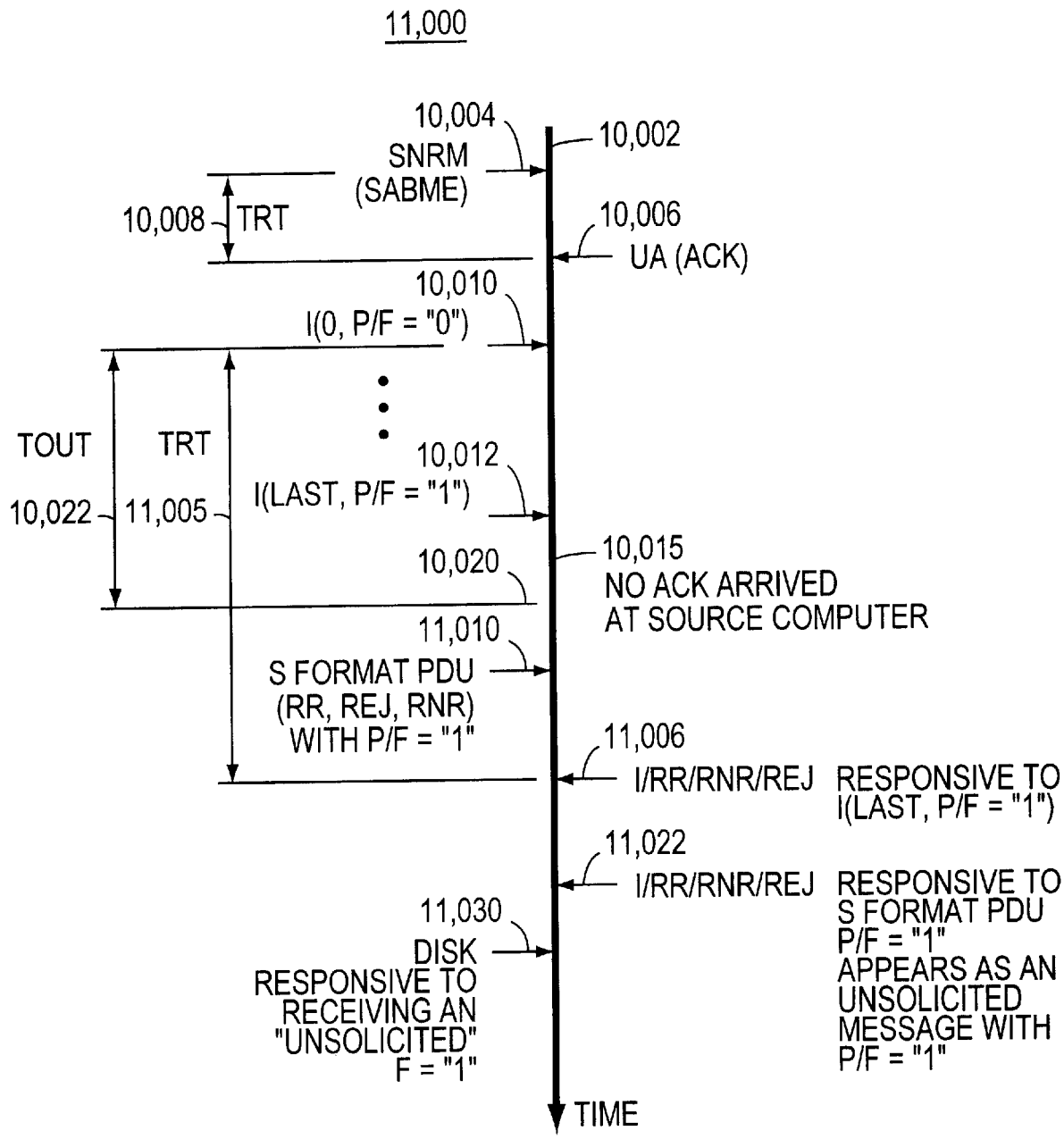
FIG. 11 is a timing diagram for operation of a LLC type 2 reliable transport showing an inadvertent timeout.

Turning now to FIG. 11, loss of the ACK message expected to be received at time 10,015 is analyzed. In the event that the ACK acknowledgment message which should arrive at time 10,015 is corrupted and lost, or is not otherwise received by source router 104 at time 10,015, then the ACK timer in source router 104 will continue to tick. The ACK timer expires at time 10,020 at the end of time interval TOUT 10,022. After expiration of the ACK timer at time 10,020, source router 104 transmits a poll frame (S Format PDU with P/F bit set="1", where the P/F bit may be bit 510 or bit 708, etc.) to router 106 at time 11,010, in order to determine if router 106 is still operative. Because no ACK was received during the TOUT time interval 10,022, it is possible that router 106 has gone off line, link 102 has been broken, etc. The poll frame has the purpose of interrogating router 106 to see if it is still on line and active.

For example, in the event that no further acknowledgment is received from router 106, source router 104 may transmit several poll frames (a multiple try procedure in order to try and raise a response from the destination router) upon expiration of further time out periods TOUT 10,022 (not shown), and finally if no response is received from destination router 106 then the communication session is ended on the assumption that the link 102 is not operative.

In an alternative example, in the event that the link 102 is simply slow and is in fact operative, then after a long time interval TRT 11,005 an acknowledgment packet will finally arrive at time 11,006. However, the acknowledgment timer has already expired at the earlier time 10,020, and the source computer has transmitted a poll frame at time 11,010. Then at time 11,022 a response to the poll frame (transmitted at time 11,010 arrives at the source computer. The arrival of two response frames in succession, the first at time 11,006 and the second at time 11,022 is a violation of the IEEE 802.5 protocol rules with the result that the communication session is ended at time 11,030 on the grounds that an unsolicited response frame, any of I, RR, REJ, or RNR, was received. This ending of the communication session in response to a slow network return time is a great inconvenience to users of the network, and is a problem solved by the present invention.

The present invention uses the latest value of the return time TRT, for example TRT 11,005, to re-compute the timing interval TOUT 10,022 so that under the present network dynamic conditions the time interval TOUT is long enough for an acknowledgment frame to return to the source station. Subsequent transmissions by the source station will then function correctly, as described with reference to FIG. 10.

In the event that the network return time becomes smaller because, for example, congestion at an intermediate router decreases, etc., then the dynamic calculation of TOUT by Equation 1 and Equation 2 will give smaller values of TOUT so that the source station waits for an optimum time before transmitting.

An advantage of the present invention is that computing the time out interval TOUT 10,022 in accordance with Equation 1 and Equation 2 of the present invention avoids the problems of the prior art in which operators had to manually set values of TOUT in order to accommodate slow links, obsolete hardware, congestion on the link, etc., as illustrated in FIG. 11.

It is to be understood that the above described embodiments are simply illustrative of the principles of the invention. Various other modifications and changes may be made by those skilled in the art which embody the principles of the invention and fall within the spirit and scope thereof.

What is claimed is:

1. A method for computing a timing interval for an ACK timer in a protocol layer LLC type 2 reliable transport session, comprising:
   measuring a time interval between transmission of a frame by a source computer to a destination computer, and receipt of a corresponding acknowledgment frame by said source computer from said destination computer, said time interval measured by said source computer;
   computing a dynamic bandwidth of a connection between said source computer and said destination computer in response to said time interval; and,
   computing said timing interval in response to said bandwidth.

2. A computer readable media containing a computer executable computer program for the practice of the method of claim 1.

3. Electromagnetic signals propagating over a computer network, said electromagnetic signals carrying information for execution in a processor to practice the method of claim 1.

4. A method for establishing a timing interval for a retransmission timer in a protocol layer LLC type 2 session, comprising:
   measuring a time interval (designated as TRT) between transmission of a frame by a source computer to a destination computer, and receipt of a corresponding acknowledgment frame by said source computer from said destination computer;
   computing a bandwidth (designated as A) of the intermediate link in response to said time interval by the formula, $A$ (bytes/sec)$_{13}$=(Number of bytes transmitted in round trip)/TRT;

and,
   computing said timing interval (designated TOUT) for said retransmission timer by the formula:

$TOUT$(Number of bytes per packet)/$A$)+(time adder for uncertainty), where "Number of bytes per packet" is the number of bytes to be subsequently transmitted with acknowledgment.

5. The method as in claim 4 further comprising:
   computing said "time adder for uncertainty" as a selected percentage of the term, (Number of bytes per packet)/$A$).

6. The method as in claim 5 further comprising: selecting said percentage in response to a percentage of timeouts occurring at said source computer.

7. The method of claim 4 further comprising:
   selecting said "time adder for uncertainty" as zero.

8. An apparatus to adapt an acknowledgment message timing interval to a measurement of packet round trip time in a protocol layer LLC type 2 reliable transport session, comprising:
   means for measuring a time interval between transmission of a frame by a source computer to a destination computer, and receipt of a corresponding acknowledgment frame by said source computer from said destination computer, said time interval measured by said source computer;
   means for computing a dynamic bandwidth of a connection between said source computer and said destination computer in response to said time interval; and,
   means for computing said timing interval in response to said bandwidth.

9. An apparatus to adapt an acknowledgment message timing interval to a measurement of packet round trip time in a protocol layer LLC type 2 reliable transport session, comprising:
   a time interval determining device in a source computer to measure a time interval between transmission of a frame by said source computer to a destination computer, and receipt of a corresponding acknowledgment frame by said source computer from said destination computer;
   a first computation unit in said source computer to compute a dynamic bandwidth of a connection between said source computer and said destination computer in response to said time interval; and,
   a second computation unit in said source computer to compute said timing interval in response to said bandwidth.

10. A computer readable media containing a computer program to perform a calculation of a timing interval for a method of adapting a timing interval of an ACK timer in a protocol layer LLC type 2 reliable transport session, comprising:

measuring a time interval between transmission of a frame by a source computer to a destination computer, and receipt of a corresponding acknowledgment frame by said source computer from said destination computer, said time interval measured by said source computer;

computing a dynamic bandwidth of a connection between said source computer and said destination computer in response to said time interval; and, computing said timing interval in response to said bandwidth.

11. Electronic signals on a computer network, said electronic signals transmitted to a computer, said signals transmitting a computer program to perform a calculation of a timing interval for a method of adapting a timing interval of an ACK timer in a protocol layer LLC type 2 reliable transport session, comprising:

measuring a time interval between transmission of a frame by a source computer to a destination computer, and receipt of a corresponding acknowledgment frame by said source computer from said destination computer, said time interval measured by said source computer;

computing a dynamic bandwidth of a connection between said source computer and said destination computer in response to said time interval; and, computing said timing interval in response to said bandwidth.

12. A method for computing a timing interval for an ACK timer in a protocol layer LLC type 2 reliable transport session, comprising:

measuring a time interval between transmission of a frame by a source computer using a LLC type 2 reliable transport session to a destination computer also using a LLC type 2 reliable transport session, and receipt of a corresponding acknowledgment frame by said source computer from said destination computer, said time interval measured by said source computer;

computing a dynamic bandwidth of a connection between said source computer and said destination computer in response to said time interval; and, computing said timing interval in response to said bandwidth.

13. A method for establishing a timing interval for a retransmission timer in a protocol layer LLC type 2 session, comprising:

measuring a time interval (designated as TRT) between transmission of a frame by a source computer using a LLC type 2 reliable transport session to a destination computer also using a LLC type 2 reliable transport session, and receipt of a corresponding acknowledgment frame by said source computer from said destination computer;

computing a bandwidth (designated as A) of the intermediate link in response to said time interval by the formula, $$A(\text{bytes/sec}) = (\text{Number of bytes transmitted in round trip})/TRT;$$

and, computing said timing interval (designated TOUT) for said retransmission timer by the formula:

$$TOUT = (\text{Number of bytes per packet})/A + (\text{time adder for uncertainty}),$$

where "Number of bytes per packet" is the number of bytes to be subsequently transmitted with acknowledgment.

14. An apparatus to adapt an acknowledgment message timing interval to a measurement of packet round trip time in a protocol layer LLC type 2 reliable transport session, comprising:

means for measuring a time interval between transmission of a frame by a source computer using a LLC type 2 reliable transport session to a destination computer also using a LLC type 2 reliable transport session, and receipt of a corresponding acknowledgment frame by said source computer from said destination computer, said time interval measured by said source computer;

means for computing a dynamic bandwidth of a connection between said source computer and said destination computer in response to said time interval; and, means for computing said timing interval in response to said bandwidth.

15. An apparatus to adapt an acknowledgment message timing interval to a measurement of packet round trip time in a protocol layer LLC type 2 reliable transport session, comprising:

a time interval determining device in a source computer to measure a time interval between transmission of a frame by said source computer using a LLC type 2 reliable transport session to a destination computer also using a LLC type 2 reliable transport session, and receipt of a corresponding acknowledgment frame by said source computer from said destination computer;

a first computation unit in said source computer to compute a dynamic bandwidth of a connection between said source computer and said destination computer in response to said time interval; and, a second computation unit in said source computer to compute said timing interval in response to said bandwidth.

* * * * *